FREQUENCY RINGING TEST TRUNK CIRCUIT

Filed Aug. 4, 1971 11 Sheets-Sheet 1

AMIN Y. ZAKY
INVENTOR.

BY Charles C. Krawczyk
Donald M. Winegar
ATTORNEYS

AMIN Y. ZAKY
INVENTOR.

BY Charles C. Krawczyk
Donald M. Winegar
ATTORNEYS

INVENTOR.
AMIN Y. ZAKY

BY Charles C. Krawczyk
Donald M. Winegar
ATTORNEYS

FREQUENCY RINGING TEST TRUNK CIRCUIT

Filed Aug. 4, 1971 11 Sheets-Sheet 4

AMIN Y. ZAKY
*INVENTOR.*

BY Charles C. Krawczyk
Donald M. Winegar
*ATTORNEYS*

Jan. 23, 1973 A. Y. ZAKY 3,712,963

FREQUENCY RINGING TEST TRUNK CIRCUIT

Filed Aug. 4, 1971 11 Sheets-Sheet 5

AMIN Y. ZAKY
INVENTOR.

BY Charles C. Krawczyk
Donald M. Winegar
ATTORNEYS

FREQUENCY RINGING TEST TRUNK CIRCUIT

Filed Aug. 4, 1971 11 Sheets-Sheet 6

AMIN Y. ZAKY
INVENTOR.

BY [signature]
[signature]
ATTORNEYS

AMIN Y. ZAKY
INVENTOR.

BY Charles C. Krawczyk
Donald M. Winegar
ATTORNEYS

Jan. 23, 1973 A. Y. ZAKY 3,712,963

FREQUENCY RINGING TEST TRUNK CIRCUIT

Filed Aug. 4, 1971 11 Sheets-Sheet 8

AMIN Y. ZAKY
*INVENTOR.*

BY Charles C Krawczyk
Donald M. Winegar
*ATTORNEYS*

FREQUENCY RINGING TEST TRUNK CIRCUIT

Filed Aug. 4, 1971

AMIN Y. ZAKY
*INVENTOR.*

BY Charles C. Krawczyk
Donald M. Winegar
ATTORNEYS

AMIN Y. ZAKY
INVENTOR.

BY Charles C. Krawczyk
Donald M. Winegar
ATTORNEYS

AMIN Y. ZAKY
INVENTOR.
BY Charles C. Krawczyk
Donald M. Winegar
ATTORNEYS

United States Patent Office 3,712,963
Patented Jan. 23, 1973

3,712,963
FREQUENCY RINGING TEST TRUNK CIRCUIT

Amin Y. Zaky, Rochester, N.Y., assignor to Stromberg-Carlson Corporation, Rochester, N.Y.

Filed Aug. 4, 1971, Ser. No. 168,919
Int. Cl. H04m 3/22
U.S. Cl. 179—175.2 B 14 Claims

ABSTRACT OF THE DISCLOSURE

A frequency ringing test trunk circuit, when seized, detects frequency ringing signals received at one of the tip and ring lines from a test desk in a distant office, and transmits a frequency ringing signal corresponding to the received ringing signal via a local office to signal a called party line subscriber. The frequency ringing signal transmitted by the trunk circuit need not be the same as that received. When the called party answers, the trunk circuit stops ringing and signals to the test desk that the called party has answered. As many as ten party subscriber telephone sets can be connected to one telephone line and may be separately rung by the test desk at the distant central office. The frequency ringing trunk circuit also includes modifications in the trunk circuit for use with longer lines and also for inhibiting the trunk circuit during the silent periods between ringing bursts.

BACKGROUND OF THE INVENTION

(1) Field of the invention

This invention relates to telephone trunk circuits in general and, in particular, to a frequency ringing test trunk circuit which serves as a means for translating frequency ringing signals from a test desk in a distant central office to a selected telephone set.

(2) Description of the prior art

Heretofore several problems have existed where testing of local subscriber telephone connections is initiated at a distant office and must be transmitted to a subscriber line through an intermediate local office. Under such an arrangement, the ringing signals are generated at a test desk in the distant office and are transmitted via the local office to signal the called party. Often in such arrangements, the resistance of the connection is high due to the length of the wires wherein the magnitude of the ringing signal received by the called party may be insufficient to properly operate the ringer. In the case of large party line connections having frequency sensitive ringers, if the frequency of the ringing signals employed at the distant office do not correspond to the resonant frequency of the ringer in the selected subscriber, the subscriber would not be properly signalled. Thus, the frequency of the incoming frequency ringing signal in the prior art had to be the same as that of the frequency ringing signal assigned to the subscriber telephone set being tested. In addition, due to the high resistance connections, when the called subscriber goes "off hook" in answer to being called, the ring-trip relay in the distant office often failed to detect the "off hook" condition.

An object of this invention is to provide a new and improved frequency ringing test trunk circuit.

An object of this invention is to provide a new and improved frequency ringing trunk circuit that functions as a repeater circuit to transmit frequency ringing signals and answer supervision signals between a distant office and a local office.

An object of this invention is to provide a new and improved frequency ringing trunk circuit for detecting a frequency ringing signal received from a test desk in a distant central office and transmitting a frequency ringing signal corresponding to the incoming frequency ringing current to a local party line subscriber.

An object of this invention is to provide a new and improved frequency ringing trunk circuit that provides a conversion function if the frequency of the ringing signal differs from that assigned by a local office to party line subscribers.

Another object of this invention is to provide a new and improved frequency ringing trunk circuit in a local central office including provisions for adapting the circuit for functioning with high resistive trunk lines.

BRIEF DESCRIPTION OF THE INVENTION

A frequency ringing trunk circuit is disclosed that functions as a repeater for translating frequency ringing signals from a distant telephone office to a local telephone office. Circuit means provide a multi-wire connection between a trunk line from a distant office and the local office that is responsive to the presence of a signal from a distant office for opening the connection and detecting the presence and determining the frequency of a ringing signal from the distant office. A ringing signal is applied to the connection to the local office that has a frequency that is a function of the frequency of the ringing signal from the distant office. The frequency of the ringing signal can be the same as that received from the distant office, or different, in which case, the trunk circuit provides a converting function for converting received frequency ringing signals to the frequency ringing signals assigned to the subscribers by the local office. Circuit means detects when the subscriber goes off hook, removes the frequency ringing signal, and applies a load to the connection to signal the distant office of the off hook condition.

Further features of the invention include modifications for adapting the frequency ringing trunk circuit to function with high resistive trunk lines, for disabling the detected circuit during the silent period between ringing bursts provisions, for busy circuit conditions and provisions for use with multifrequency dial signal testing.

DESCRIPTION OF THE PREFERRED EMBODIMENTS

Figure 1:
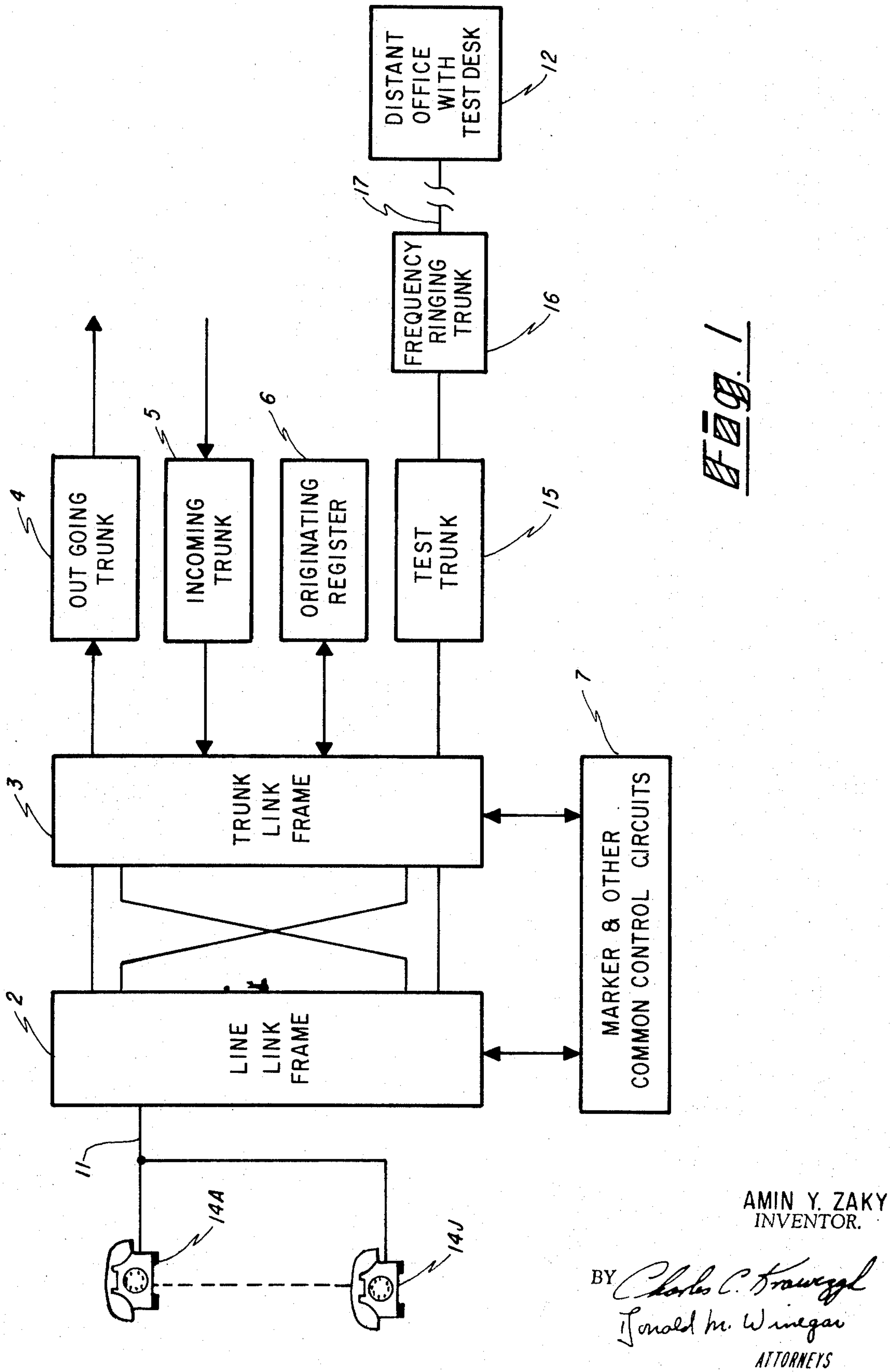
FIG. 1 is a block diagram illustrating the connection of the frequency ringing trunk circuit of the invention between a local office and a distant office having test facilities.

The frequency ringing trunk circuit 16 of the present invention may be advantageously connected to a standard test trunk circuit of an automatic telephone system wherein common control circuits are employed to control the establishment of calls through a switching network. One such system is disclosed in the A. J. Busch Pat. No. 2,585,-904, issued on Feb. 19, 1952. It is to be understood, however, that the present invention is not limited to use in a telephone system of this type, but may be utilized in other types of switching systems.

The frequency ringing test trunk circuit 16 will be described herein as being connected by a three-wire trunk line 17 between a distant office 12 including a test desk and by a test trunk 15 to the telephone system of the type disclosed in the cited Busch patent. For purposes of illustration, it is intended that the apparatus of the line link frame 2, the trunk line frame 3, the outgoing trunk 4, the incoming trunk 5, the originating register 6 and the marker and other common control circuits 7 be similar to the corresponding apparatus disclosed in the Busch patent. The test trunk circuit 15 and the test desk 12 are well known circuits presently in use. As fully disclosed in the Busch patent, the telephone lines terminated on the line link frames and the circuits terminated on the trunk link frames are interconnected by crossbar switches by these frames and by interframe junctor circuits. All such interconnections are effected under control of a common group of circuits including marker and other common control circuits.

A plurality of telephone sets 14A–14J are illustrated connected as party line connections to a common telephone line 11 for connection via the line link frame and the trunk link frame to any of the trunk circuits. In party line connections, each telephone set on the party line must be signalled in a manner so that the called subscriber can identify that the particular call is directed to him. In large party lines, the individual parties can be signalled by either code ringing or frequency ringing. Code ringing generally entails signalling the subscribers by a series of predetermined ringing bursts wherein all the telephone sets on the same party line are rung. This is a rather undesirable feature since each telephone on the same line will be rung for all calls. In frequency ringing, each of the party lines are provided with a separate signalling arrangement wherein the ringers are connected to either the tip or ring line and are tuned to different resonant frequencies corresponding to different ringing frequencies.

In the usual arrangement of the prior art, a test desk is provided at one central office and is connected via trunk lines to the test trunks of a plurality of local offices. The test trunk provides a means for connecting the distant office to any one of the telephone sets via the local office for test purposes. The distant office 12 with the test desk includes a ringing generator for applying any selected one of five ringing frequencies to either the tip or the ring line of the three-wire trunk line 17. This common ringing generator is generally used to provide the ringing test signals for a plurality of telephone offices, some of which may assign ringing frequencies to its connected telephone sets that are different from that generated at the test desk. The frequency ringing test trunk 16 of the invention functions as a ringing signal repeater thereby overcoming the problems associated with long line connections and, in addition, if necessary, also provides a conversion function for converting the incoming frequency ringing signal to the frequency ringing signals assigned to the telephone sets connected to the associated office.

Figures 2, 3:
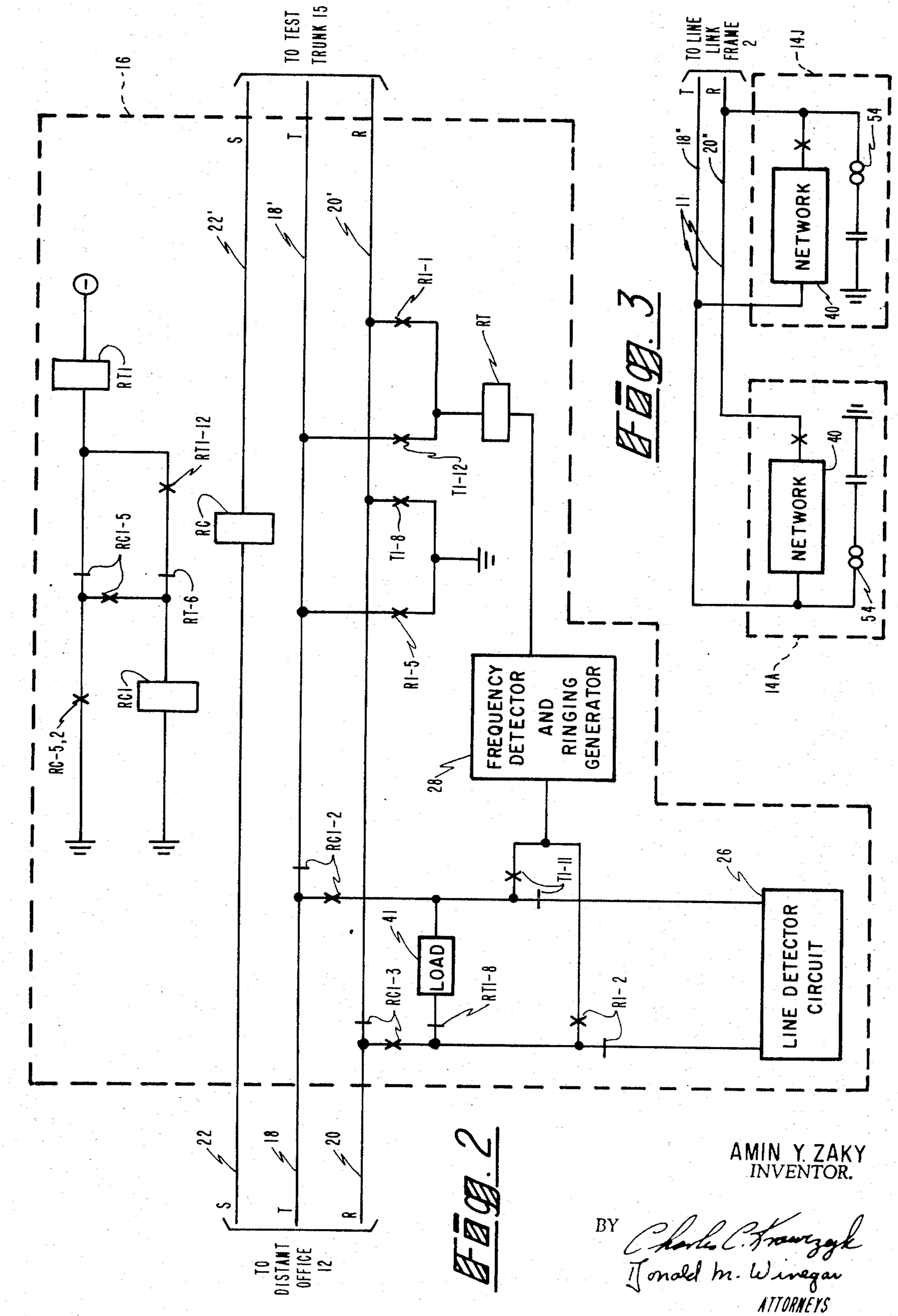
FIG. 2 is a simplified schematic diagram of the frequency ringing trunk circuit of the invention.
FIG. 3 is a simplified schematic diagram of a plurality of telephones connected in a party line configuration.

Referring now to FIG. 2, there is shown an electrical schematic of a frequency ringing test trunk circuit 16 of the invention. A tip lead 18, a ring lead 20, and a sleeve lead 22 comprising the three-wire trunk line 17 originating from the distant central office 12, is adapted for connection through the frequency ringing trunk circuit 16 (via a tip lead 18', a ring lead 20' and a sleeve lead 22') and the switch equipment of the local office to a party line 11. The party line 11 can have as many as ten party line telephone sets 14A–14J connected thereto that can be signalled from the test desk at the distant office 12 via the trunk circuit 16.

Figure 14:
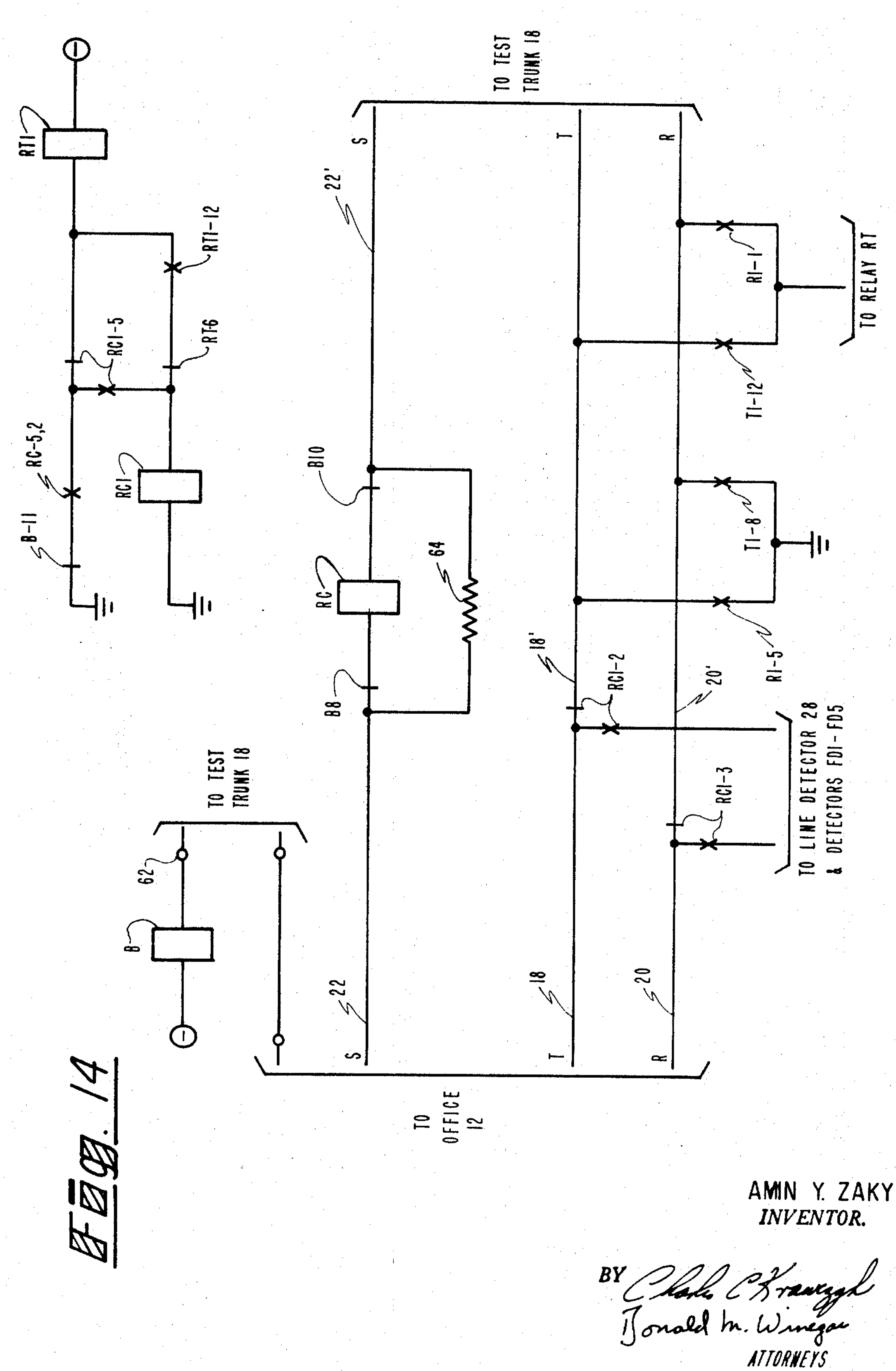
FIG. 14 includes a modification of the circuit of FIG. 2 including provisions for use with a test distributor and busy connnections.

The frequency ringing trunk circuit is seized by the test desk at the distant central office 12 by applying a high potential to the sleeve lead 22. When seized, the trunk circuit 16 transfers the tip lead 18 and ring lead 20, to a line detector circuit 26. Ringing signals, such as the standard one out of five frequencies, corresponding to the party being rung, is sent from the test desk on either one of the tip or ring leads depending upon whether the called party is connected to a tip or ring lead ringing arrangement. The party line telephones 14A–14J have their ringers 54 (FIG. 3) connected between either the tip lead and ground, or the ring lead and ground. The ringers 54 are tuned to be sensitive to one of five ringing frequencies. The line detector circuit 26 detects whether the frequency ringing signal is on the tip lead 18 or ring lead 20 and then transfers the tip or ring lead to a frequency detector and generator circuit 28. The frequency detector and generator circuit 28 determines the frequency of the received ringing signal and applies the same frequency of ringing signal (or if necessary converts the received ringing signal to a corresponding frequency ringing signal), to the tip lead 18' or ring lead 20' (depending upon the called party) through a ring-trip relay RT. When the called party answers, the relay RT operates to interrupt the ringing signal and transmits an answer supervision signal to the distant central office 12 by applying a load 41 across the tip line 18 and ring line 20 extending thereto. Various arrangements are included to modify the trunk circuit 16 for use with longer lines (FIGS. 9, 10 and 11), for activating the line detector circuit 26 only during the presence of ringing signals (FIG. 12) and for inhibiting the circuit in case the line is busy (FIG. 14). When used with test trunk circuits in the local office having provisions for testing with multifrequency dial signals, the trunk circuit 16 is provided with means for inhibiting the circuit during the duration of multifrequency dial signal testing.

The frequency ringing trunk circuit 16 functions to analyze the frequency ringing signal received from the test desk in the distant central office 12 and transmits the proper frequency ringing signal to the called subscriber line. The frequency of the ringing signals transmitted by the trunk circuit 16 is of either the same as, or different than, that of the received frequency ringing signal. The trunk circuit 16 thus serves as an intermediate circuit between the test position in the office 12 and the terminating equipment in the local central office to provide a ringing signal conversion function (if needed) as well as providing a frequency ringing repeater function. As previously mentioned, the trunk circuit 16 also detects an off hook condition and transmits a corresponding signal to the test position in the distant central office 12.

Figure 4:
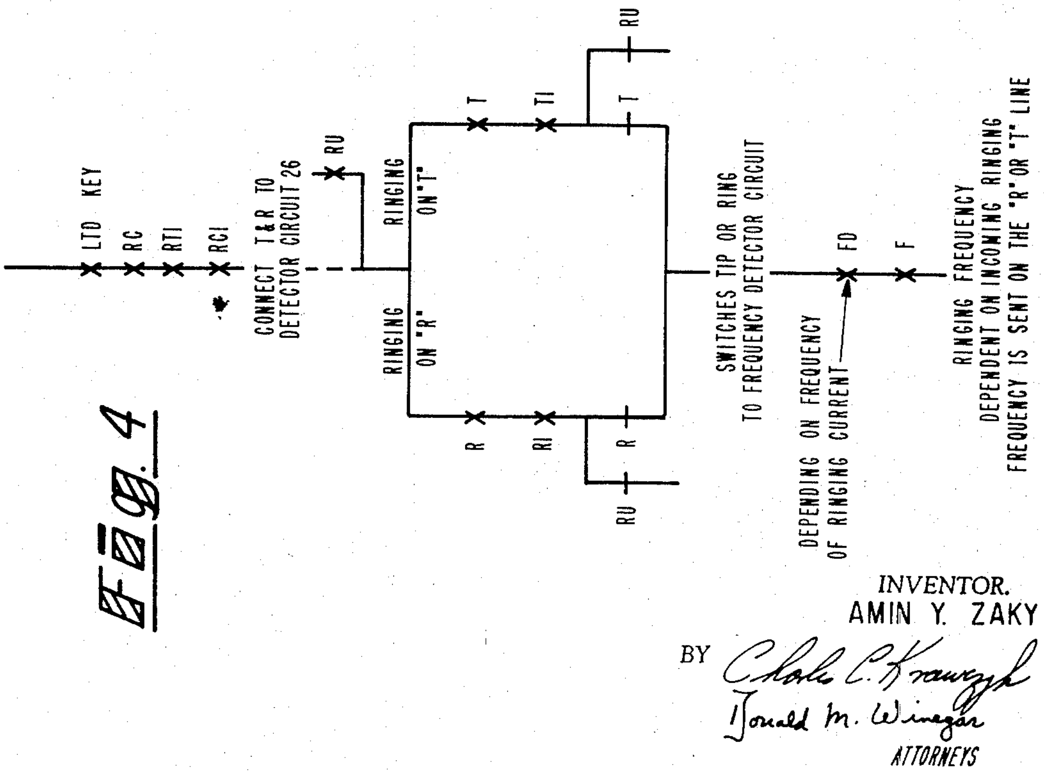
FIG. 4 is a chart indicating the switching sequence for transmitting a ringing signal from the frequency trunk circuit of the invention in response to test ringing signals from the distant office.

FIGS. 4, 8, 13 and 16 include charts describing the sequence of circuit operation. The symbol X denotes that a relay operates while the dash symbol (—) denotes that a relay is released. FIG. 4 includes the sequence from seizure of the frequency ringing test trunk to ringing a subscriber. The trunk circuit 16 is seized by the distant central office 12 by depressing an LTD key at the test desk so that positive battery potential of approximately 110 volts DC is applied from a resistance battery to the sleeve lead 22 causing a polarized relay RC (FIG. 2) to pick up. The relay RC, when picked up, closes the contacts RC5–2 causing a relay RT1 to pick up which, in turn, closes the contacts RT1–12 for operating a relay RC1 through the contacts RT6, RC1–5 and RT1–12. The relay RC1 is then held operated through its own contact RC1–5. The relay RC1, when picked up, connects the tip and ring leads 18 and 20 of the trunk line from the office 12 to the line detector circuit 26 by means of contacts RC1–2 and RC1–3. Relay RT1 remains picked up through the contacts RC1–5, RT–6, RC5–2 and RT1–12.

Through the use of frequency ringing, as many as ten different telephone sets on a single party line can be rung by the testman in the office 12. For example, when ten different parties are connected to one party line, the ringer circuits of five parties 14A–14E can be connected to the tip lead, and the ringer circuits of five parties 14F–14J can be connected to the ring lead. All ten different party telephone sets can be rung from the test position by applying any one of five different ringing frequencies to either the ring lead, or the top lead, as required by the testman in office 12.

Figure 5:
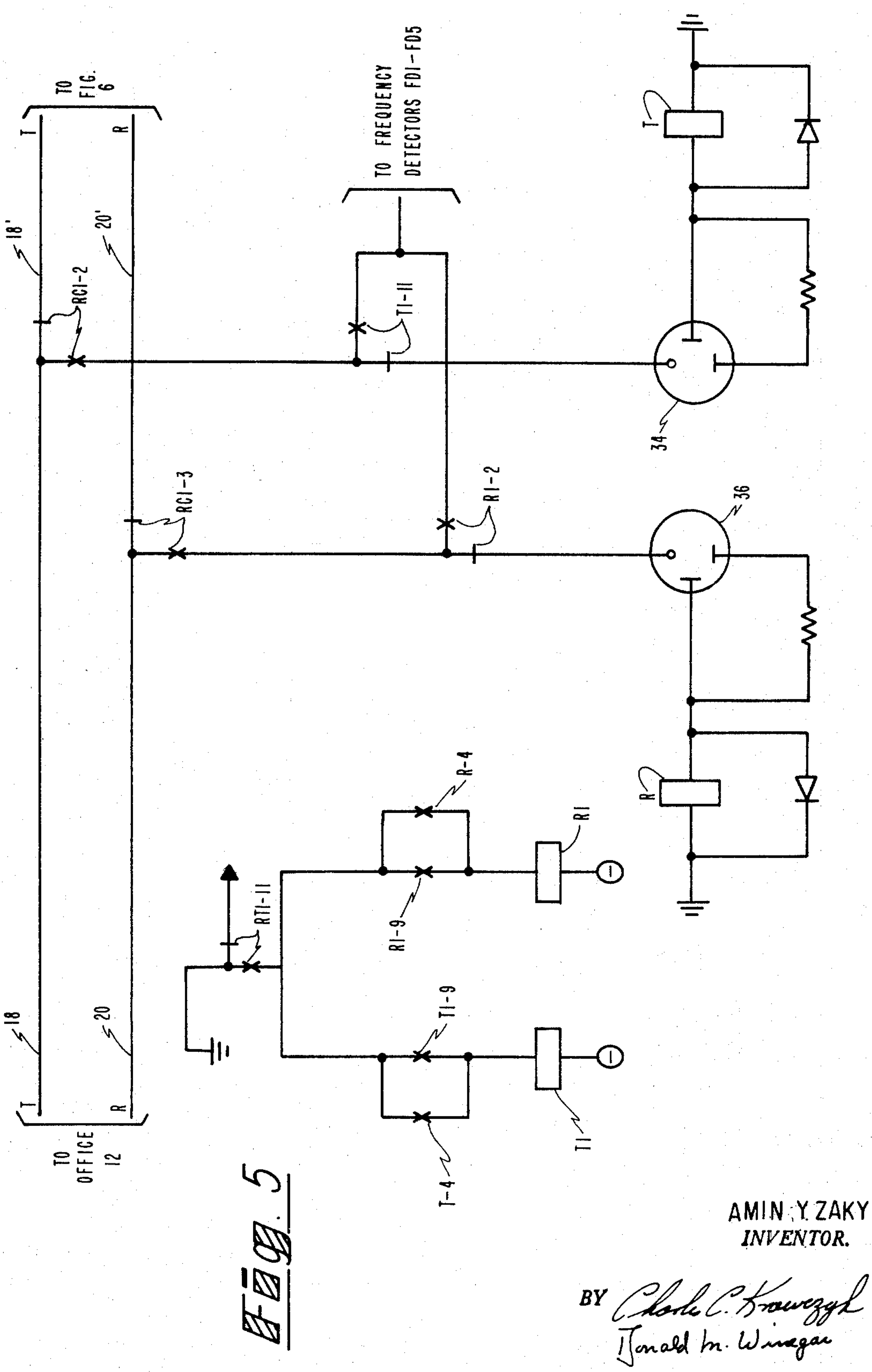
FIG. 5 is a schematic diagram of the line detector circuit of FIG. 2.

In the line detector circuit 26 (FIG. 5) a frequency ringing signal on the tip lead 18 is detected by a cold cathode tube 34 while a frequency ringing signal on the ring lead 20 is detected by a cold cathode tube 36. With the frequency ringing signal on the tip lead, the cold cathode tube 34 fires and operates a relay T. Upon being picked up, the relay T causes a relay T1 to be picked up through the contacts T4, R1–1 and RT1–11 to ground. When the relay T1 operates, ground is applied to the ring lead 20′ through contacts T1–8, the ring-trip relay RT is connected to the tip lead 18′ via the contacts T1–12 (FIG. 2) and the tip lead 18 is disconnected from the line detector circuit 26 and is connected to the frequency detector and generator circuit 28 via contacts T1–11. If the ringing signal is on the ring lead 18, the tube 36 fires and operates a relay R which, in turn, operates the relay R1 to ground the tip lead 18′, connects relay RT to the ring lead 20′ and connects the ring lead 20 to the frequency detectors. Only one cold cathode tube is fired at any one time and therefore only one group of the relays T and T1, or R and R1, can operate at one time.

Figure 6:
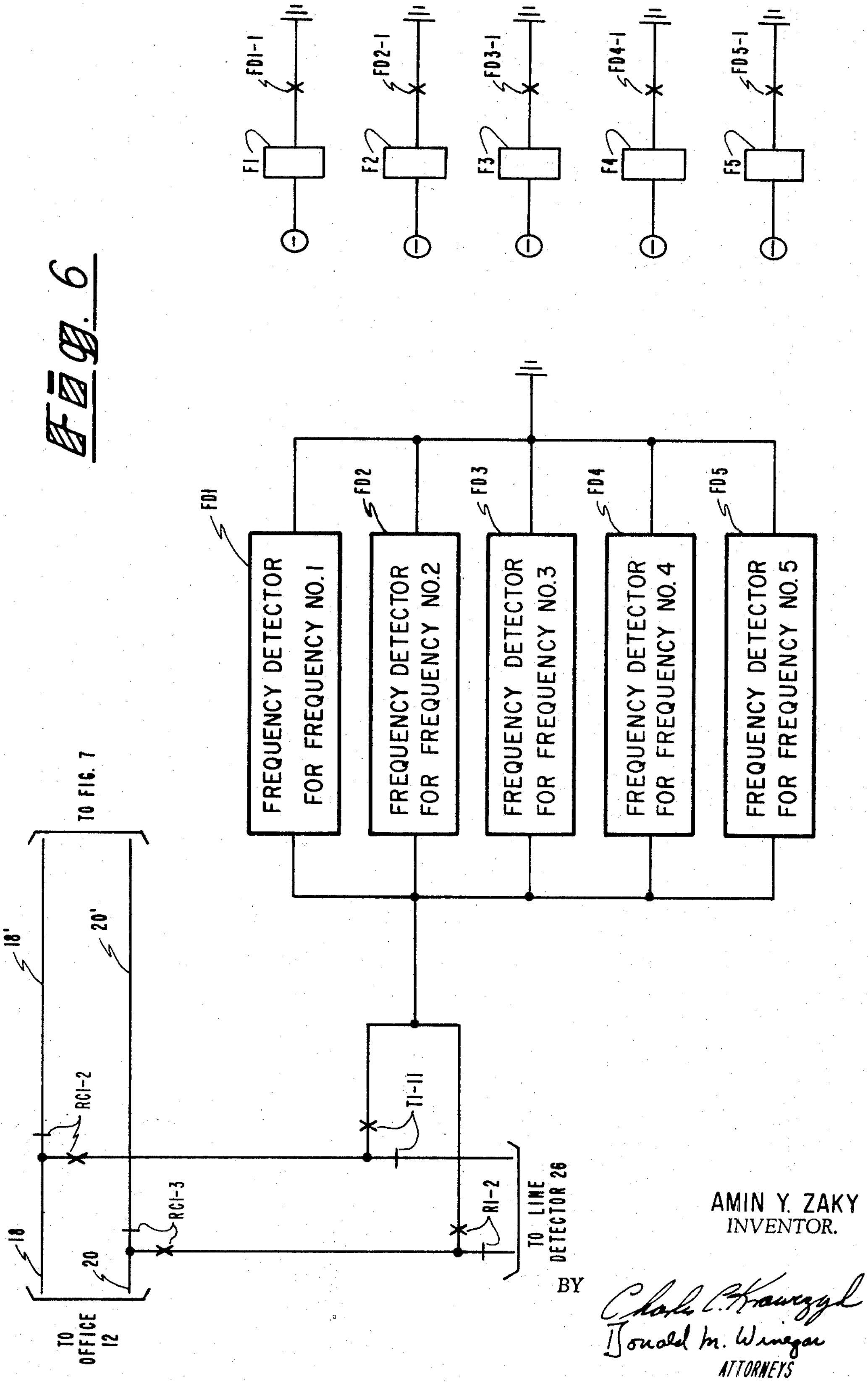
FIG. 6 is a simplified schematic diagram of the frequency detector portion of the frequency detector and ringing generator circuit of FIG. 2.

The frequency detector and generator circuit 28 (FIG. 6) includes five electronic frequency detectors, FD1 through FD5 and a frequency ringing supply generator 38 (FIG. 7) for providing any one of five separate frequency ringing signals. The frequency detectors FD1 through FD5 are employed to detect the frequency of the ringing signal applied thereto. Each frequency detector circuit is tuned to recognize a separate one of the five frequency ringing signals transmitted by the test desk. The frequency detector circuits are well known in the art and do not need any further explanation. Each of the frequency detectors FD1 through FD5 is responsive to a frequency of the ringing signal impressed on either the tip or ring lead to operate its corresponding relay F1 through F5, respectively. Any one set of three different sets of ringing frequency ringing signals can be transmitted by the test desk, i.e., synchromonic, harmonic, and decimonic and the frequency detectors are designed to detect the set so transmitted. When the one of the frequency detectors F1–F5 is responsive to the ringing signal, the corresponding relay F1–F5 connects the frequency ringing supply generator 38 to the tip line 18′, or ring line 20′, via the ring-trip relay RT and via one of the contacts T1–12, or R1–1, respectively, while the other tip line, or ring line, is grounded. For example, it can be assumed that the ringer of telephone 14A is responsive to a ringing signal corresponding to the detector FD1. In response to receiving the ringing signal, the detector circuit FD1 closes the contacts FD1–1 causing relay F1 to pick up. Upon being picked up, the relay F1 connects the frequency ringing supply generator 38, line L1, to the tip lead 18′. As previously mentioned, the ringing frequency signal from the frequency ringing supply generator 38 need not be of the same frequency signal as the ringing signal originating from the test desk at the distant central office 12. The frequency ringing test trunk 16, in such case, provides a conversion function by responding to the ringing signal from the test desk and to transmit the correct ringing signal. Relay RT is designed to conduct ringing signals without being picked up. In the present example, the frequency ringing signal would be impressed on the tip lead to traverse the local office switching equipment and actuate the ringer 54 of the telephone set 14A.

Figure 7:
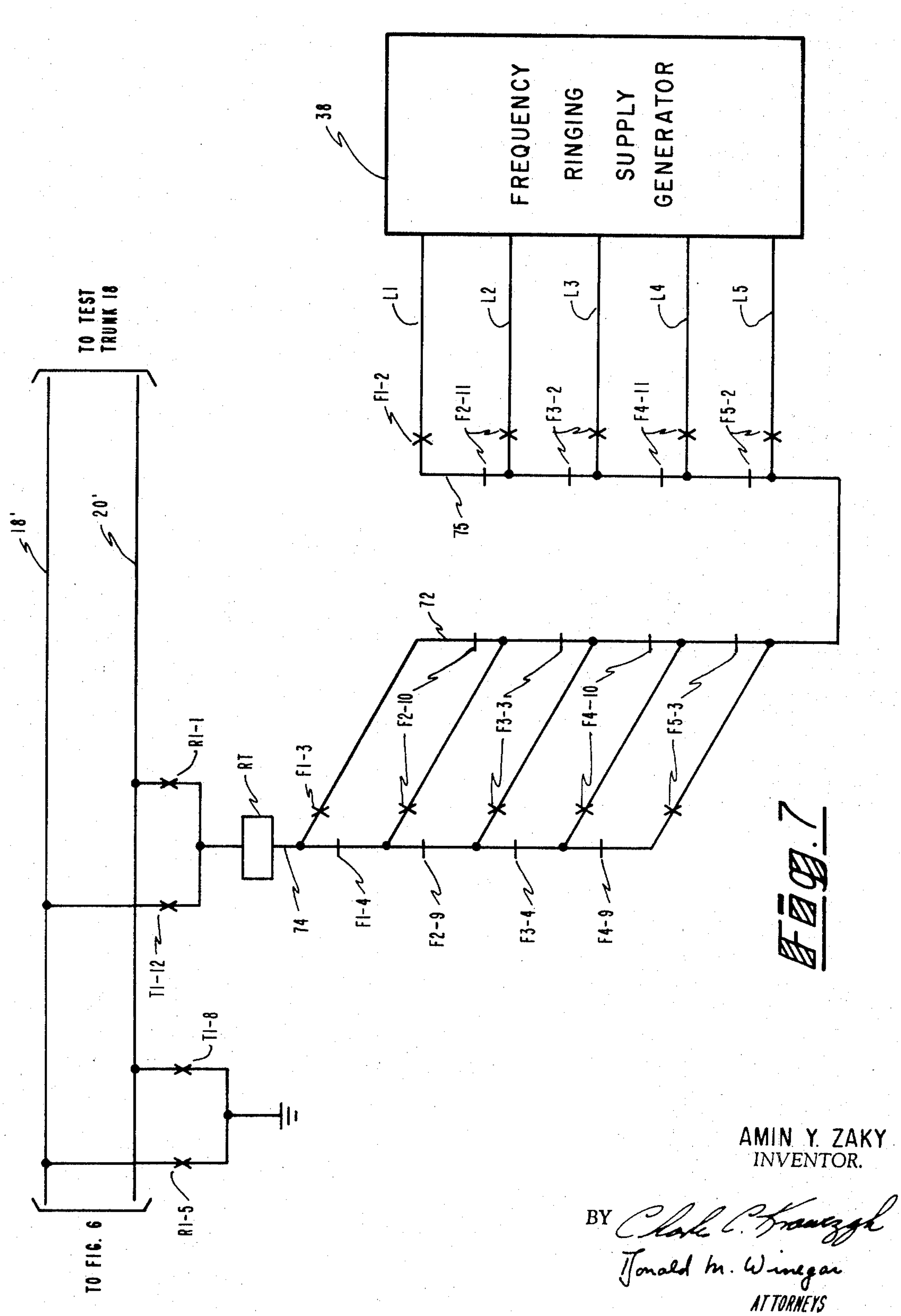
FIG. 7 is a simplified schematic diagram of the ringing generator portion of the frequency detector and ringing generator of FIG. 2.

With reference to FIG. 7, the frequency ringing trunk circuit 16 is provided with suitable circuitry means to prevent the inadvertent ringing of the wrong telephone subscriber telephone set, in and/or to prevent the ringing of more than one telephone subscriber telephone set. The common leads 70, 72 and 74 are provided to enable only the proper frequency ringing signal from the generator 38 from being impressed on either the tip or the ring lead to the telephone set being tested. For example, it is assumed that when the incoming frequency ringing current from the distant central office 12 actuated the proper electronic detector FD2 and electronic detector FD3 inadvertently is also actuated, which will actuate relays F2 and F3. In this case none of the ringing frequencies on lines L2 and L3 can be connected to the called line. Relay F2 being operated shall open the path of ringing generator line L3 by opened contact F2–9. Aslo, F3 operated will open the path of ringing generator line L2 by opened contact F3–4. Thus, no ringing potential is impressed on the called line when more than one ringing frequency is received.

Figure 8:
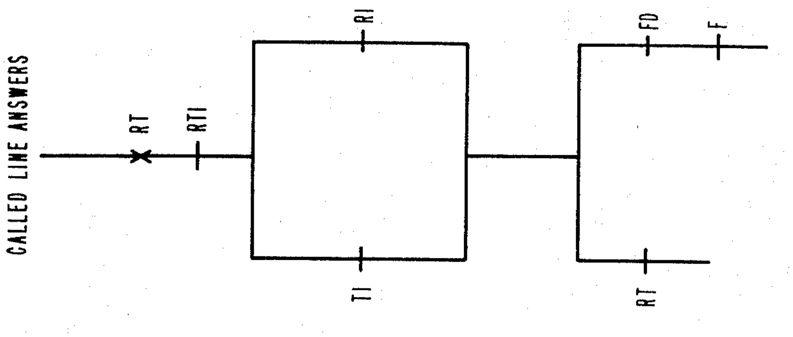
FIG. 8 is a chart indicating the switching sequence in response to the called party going off hook.

Referring now to FIGS. 2, 3 and 8, when the subscriber goes off hook in response to the ringing signal, a low impedance bridge 40 within the telephone (FIG. 3) completes the loop and picks up the relay RT. The relay RT being picked up opens contact RT–6 breaking the circuit to relay RT1. When relay RT1 drops out, the contacts RT1–8 close and connect a load 41 across the tip and ring leads 18 and 20. The load signals the test desk at the distant central office 12 that the called subscriber has answered.

Figure 13:
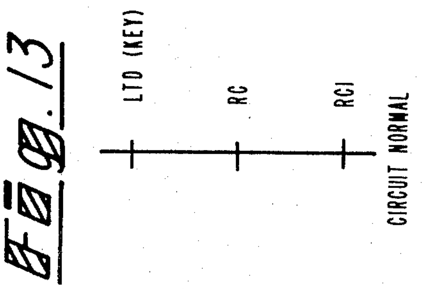
FIG. 13 is a chart indicating the switching sequence when the test key at the distant office is released.

With reference to FIGS. 2 and 13, when the testman has confirmed that subscriber 14A has been rung and a circuit completed and identified, the process of ringing the required party line is being accomplished. The testman at the distant central office then releases the ringing key (LTD) which switches the sleeve lead of the frequency ringing trunk from positive battery to negative battery. The reversal of battery potential causes the relay RC to drop out and opens contacts RC5–2 disconnecting relay RC1 from ground and the relay RC1 drops out. The relay RC1, upon dropping out, releases contacts RC1–2 and RC1–3 and the test position is now connected via the tip and ring lines to the subscriber 14A.

Figure 9:
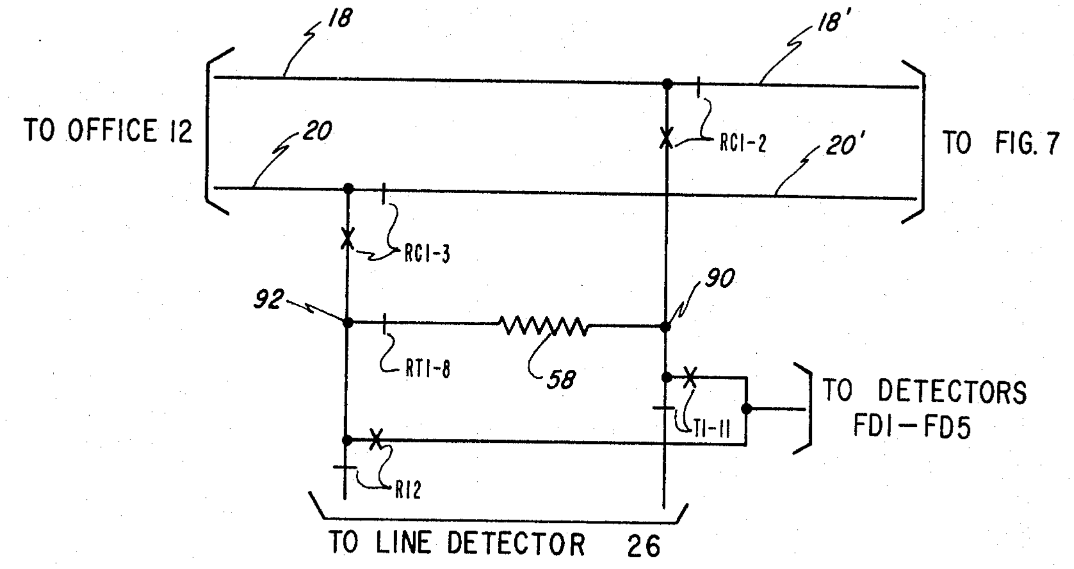
FIG. 9 is a first embodiment of a load circuit applied to the tip and ring lines extending from the distant office in response to the called party going off hook.
Figure 10:
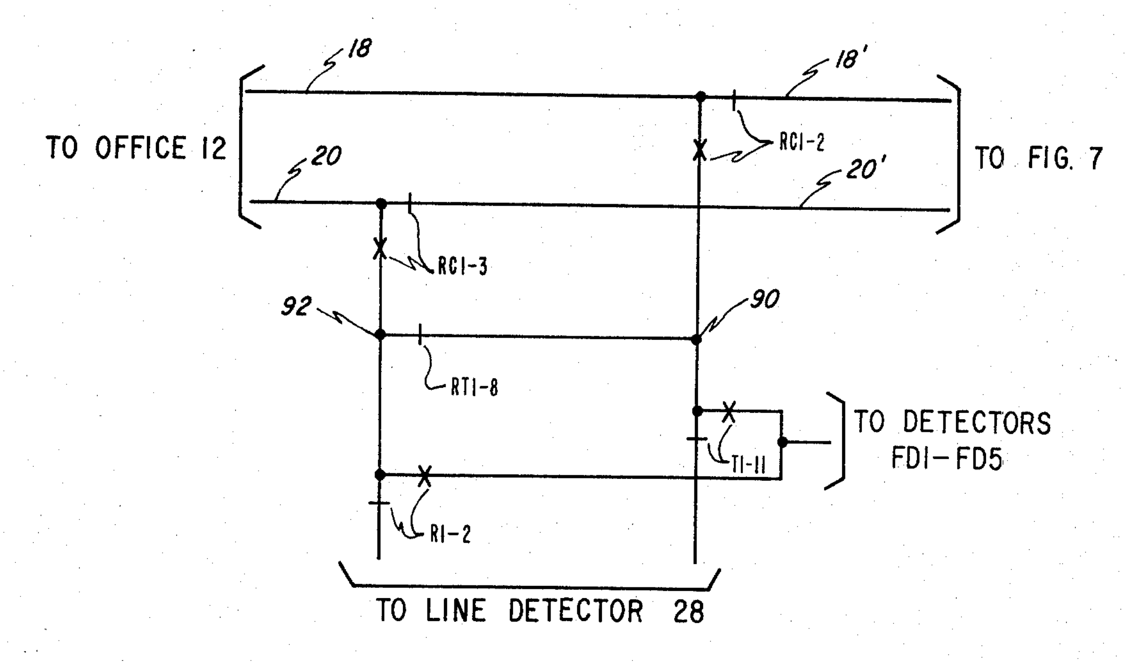
FIG. 10 includes a modification of FIG. 9 for use with long line trunk circuits.
Figure 11:
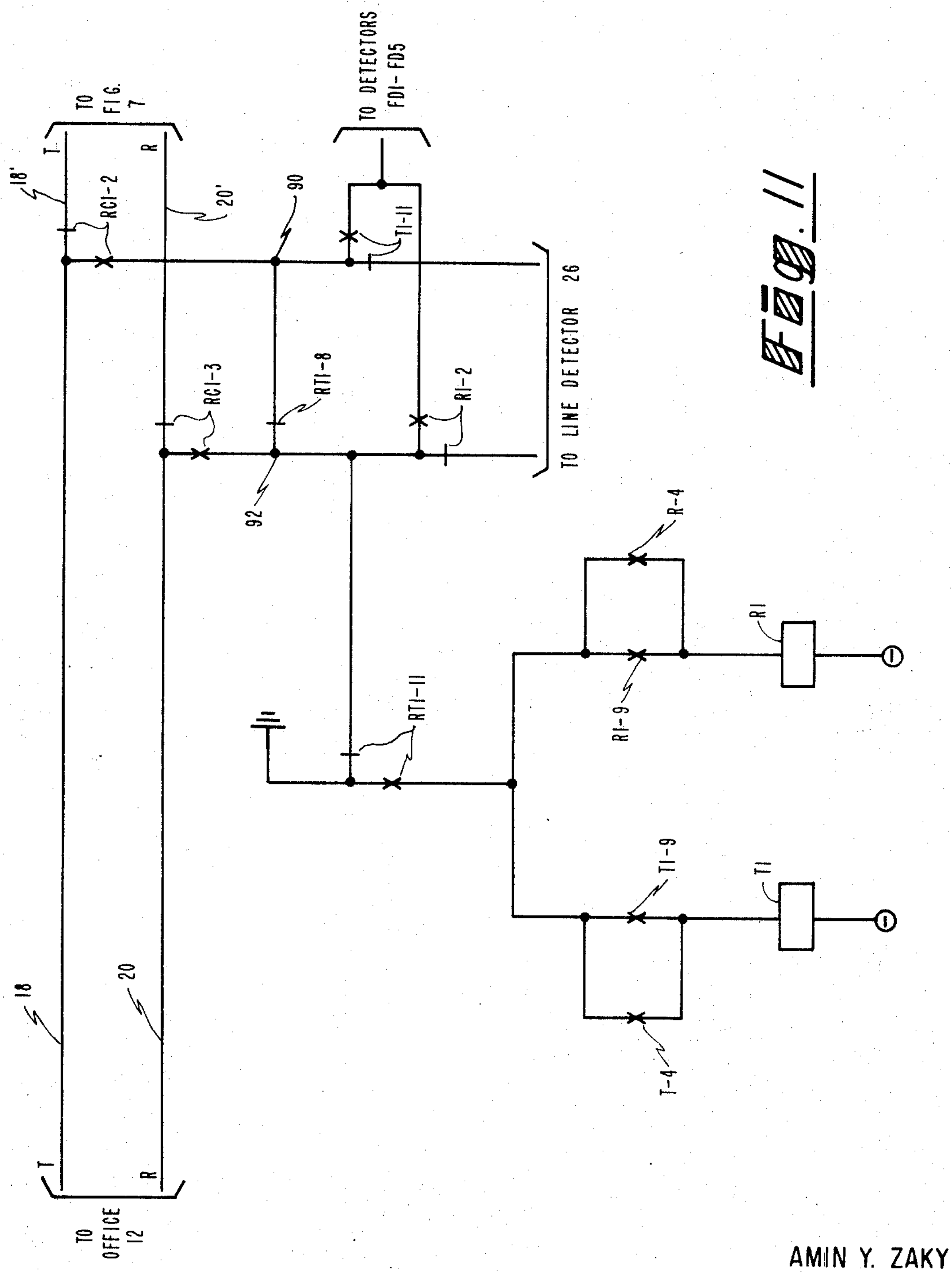
FIG. 11 is a further modification of the circuit of FIG. 9 providing an arrangement for grounding the tip and ring lines for use with long trunk lines.

The current flowing in the telephone line loop circuit connecting the distant central office 12 to the subscriber telephone set 14 should preferably not exceed a value of approximately one half ampere. Therefore, when the resistance of the connection between the distant central office 12 and the trunk circuit 16 is less than approximately 200 ohms, the load 41 takes the form of a current limiting resistor 58 (FIG. 9). When the resistance in the trunk connection is between 200 ohms and 1,500 ohms, the current limiting resistor 58 is not required and a direct short (FIG. 10) is connected to the tip and ring lines 18 and 20. In a case where the resistance of the trunk loop is greater than 1,500 ohms, the current flowing in the tip and ring lead may not be sufficient to actuate the ring-trip relay at the test position. Therefore, as shown in FIG. 11, a direct ground is applied to both tip and ring leads via contacts RT1–11, which will assure sufficient current to operate the ring-trip relay in the test position.

The relay RT1, when dropped out, also causes the relay T1 or R1 to drop out (FIG. 5) and causes the contacts T1–11 or R1–2 to open, disconnecting the frequency detector FD1–FD5. Frequency detector circuits FD1–FD5, when disconnected, causes the corresponding relay F1–F5 to drop out, disconnecting the frequency ringing supply generator 38.

Figure 12:
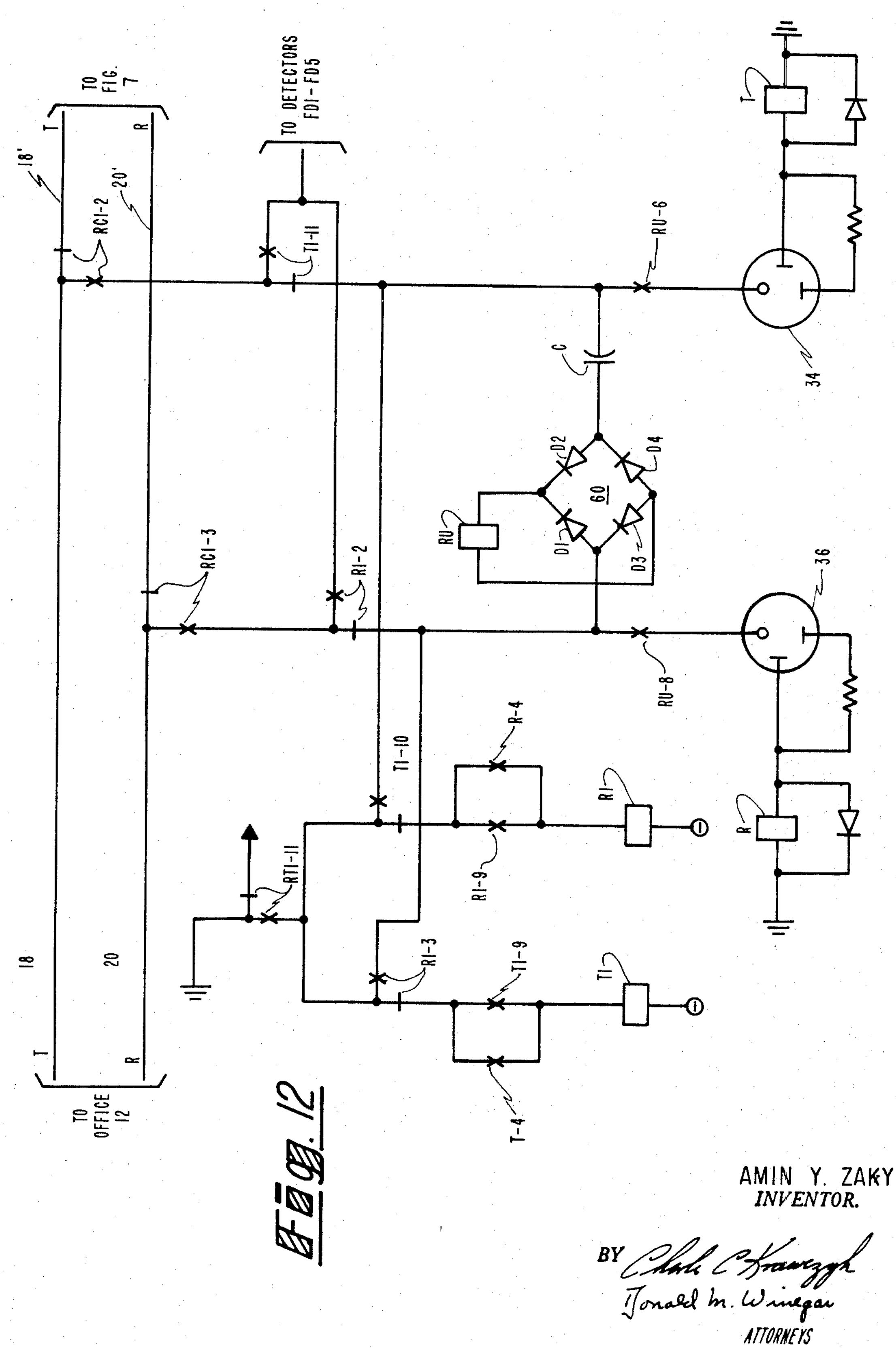
FIG. 12 is a second embodiment of the line detector circuit of FIG. 2 including provisions for inhibiting the circuit during the silent period between ringing signal bursts.

Should the DC voltage in the seized trunk line loop circuit exceed a preset value (such as, for example, 52 volts) during the silent period between ringing bursts, either one of the cold cathode tubes 34 or 36 may inadvertently be fired. The DC current passing in the cold cathode tube (being fired) may operate the relay R, or T, which, in turn, may falsely operate the ringing trip relay in the test position, thus, giving a false off hook condition. To prevent this false operation of the cold cathode tubes 34 and 36, the line detector circuit 26 is modified as shown in FIG. 12. A full wave rectifier 60 comprising diodes $D_1$, $D_2$, $D_3$ and $D_4$ is connected in series with a capacitor C across the two leads of the frequency ringing trunk circuit connected to the tip and ring leads from the office 12.

During bursts of incoming frequency ringing signals from the distant central office 12, the AC portion of the frequency ringing current is applied to the full wave rectifier 60 and converted to pulsating DC current. A relay RU is connected across the full wave rectifier 60 and is picked up by the pulsating DC current and connects the tip and ring leads to the frequency ringing trunk circuit 16 to the cold cathode tube 34 or the tube 36. When no frequency ringing signals are present, a capacitor C prevents the passage of DC current through the rectifier 60 and relay RU is dropped out, opening the contacts RU–6 and RU–8 and preventing the cold cathode tubes 34 and 36 from being falsely fired during the silent period.

If the frequency ringing trunk circuit is employed with a test distributor and a busy connection is encountered, a suitable circuit employing a relay B (FIG. 14) is provided to inhibit the trunk and will prevent the operation of relay RC. A ground potential is impressed on relay B through terminal 62 from the test trunk 15 and the relay B is picked up. The relay B upon being picked up opens contacts B–8 and B–10 opening the winding leads of relay RC and preventing relay RC from being picked up. The sleeve lead remains in a "closed" condition through a resistor 64. The relay B, when picked up, also opens contacts B–11 removing ground potential and the relays RT1 and RC1 cannot be operated and the frequency ringing trunk circuit 10 cannot be connected to the tip lead 18 and ring lead 20.

Figure 16:
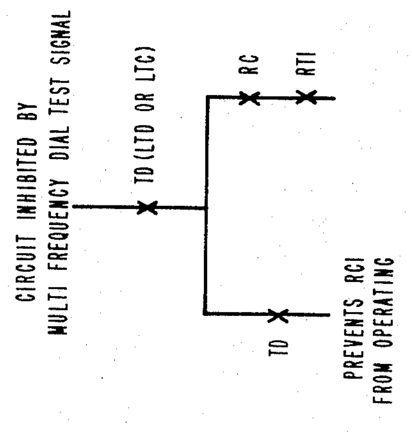
FIG. 16 is a chart indicating the switching sequence in response to multifrequency dial test signals.
Figure 15:
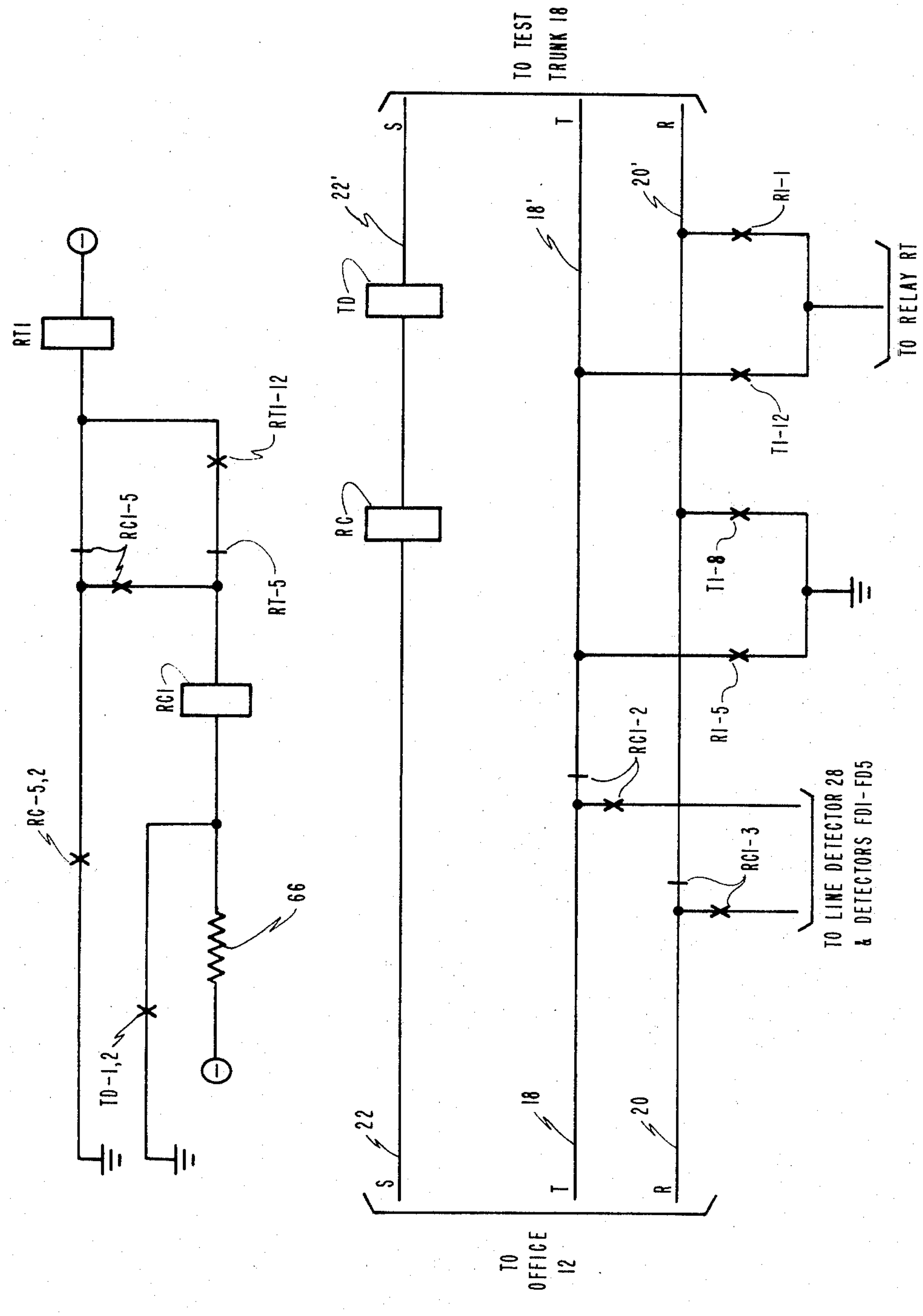
FIG. 15 is another modification of the circuit of FIG. 2 including provisions for inhibiting the frequency ringing trunk circuit of the invention when testing with multifrequency dial signals.

Referring now to FIGS. 15 and 16, the frequency ringing trunk circuit 16 is also adapted for use in testing subscriber telephone lines which comprise an electrical switching system, such, for example, as the Bell Electronic Switching System No. 1, wherein a multifrequency dial signal test applique is not incorporated therein. In such case, a relay TD is connected in series with the relay RC. In testing one of a plurality of subscriber's telephone sets 14A–14J, a low resistance positive battery potential is impressed on the sleeve lead 22 at the test position in the distant central office 12 to pick up both relays RC and TD. The relay RC, when picked up, causes the relay RT1 to pick up in the same manner as described heretofore. The relay RT1, when picked up, attempts to cause the relay RC1 to pick up, but the relay TD, when picked up, connects the battery side of the relay RC1 to ground by closing the contacts TD–2. The relay RC1 is prevented from being picked up and connecting the tip and ring leads from the distant central office to the line detector 26. The frequency ringing trunk circuit maintains this condition as long as multifrequency dial signalling testing is in progress.

What is claimed is:

1. A frequency ringing trunk circuit for translating frequency ringing signals received from a first telephone central office by a second telephone office comprising:

a multi-wire connection between the second telephone central office and a trunk line from the first central office;

first circuit means responsive to the presence of a signal from the first telephone central office on one of the wires of the multi-wire connection for opening said multi-wire connection;

second circuit means responsive to the opening of the connection for detecting the presence of a ringing signal from the first telephone central office on one of the wires of said multi-wire connection extending to the trunk line;

third circuit means for determining the frequency of the detected ringing signal;

fourth circuit means for applying a ringing signal having a frequency that is a function of the frequency of the detected ringing signal to the wires of the multi-wire connection extending to the second telephone central office, and fifth circuit means for detecting the presence of a direct current loop across the wires of the multi-wire connection extending to the second telephone central office for removing the ringing signal applied by said fourth circuit means to said multi-wire connection and applying a direct current load to wires of the multi-wire connection extending to the first telephone local office.

2. A frequency ringing trunk circuit as defined in claim 1 wherein:

said multi-wire connection includes tip, ring and sleeve wires, and said first circuit means including a relay having a coil connected in series with said sleeve line, normally closed contacts connected in series with said tip and ring lines, and normally open contacts connecting the tip and ring lines extending from the first telephone central office to said second circuit means.

3. A frequency ringing trunk circuit as defined in claim 2 wherein:

said fourth circuit means includes a ringing signal generator circuit providing a plurality of ringing signals, each of said plurality of ringing signals being of a different frequency, and said third circuit means identifies the one of said plurality of ringing signals to be applied to the multi-wire connection extending to the second telephone local office.

4. A frequency ringing trunk circuit as defined in claim 3 wherein:

said fifth circuit means comprises a relay connected to the tip and ring wires extending to the second telephone local office so that when a direct current loop is completed across the tip and ring wires, said relay operates to apply a load across the tip and ring wires extending to the first telephone central office.

5. A frequency ringing trunk circuit as defined in claim 2 wherein:

said second circuit means includes a disable circuit to disable said second circuit means except during the presence of a ringing signal in the trunk line.

6. A frequency ringing trunk circuit as defined in claim 5 wherein:

said second circuit means includes a detector circuit, and said disable circuit includes a capacitor series connected to a rectifying bridge and a relay connected across said rectifying bridge, said relay having a normally open contact in each of said tip and ring lines extending from the first telephone central office to said detector circuit.

7. A frequency ringing trunk circuit for translating frequency ringing signals received from a first telephone central office by a second telephone central office comprising:

first, second and third terminals for connection to the sleeve, tip and ring wires, respectively, of a trunk line from said first telephone central office;

fourth, fifth and sixth terminals for connection to the sleeve, tip and ring wires, respectively, to said second telephone local office;

first detection circuit means for detecting the presence of ringing signals in said trunk line;

second detection circuit means for determining the frequency of ringing signals in said trunk line;

first circuit means for normally interconnecting the second terminal to the fifth terminal and the third terminal to the sixth terminal, said first circuit means being responsive to the presence of a signal on the first terminal for disconnecting the second and fifth terminals and third and sixth terminals, and connecting the first detection circuit means to the second and third terminals to detect the presence of ringing signals impressed thereon;

second circuit means responsive to the detection of a ringing signal on one of said second and third terminals for connecting the terminal having the ringing signal impressed thereon to the second detection circuit means;

third circuit means for providing a plurality of different frequency ringing signals;

fourth circuit means connected to, and responsive to, said second detection circuit means for selecting and applying a selected one of said plurality of different frequency ringing signals of said third circuit means to one of said fifth and sixth terminals, and fifth circuit means for detecting the presence of a direct current circuit connected across the fifth and sixth terminals for removing the selected ringing signal applied to said one of said fifth and sixth terminals and for applying a direct current load across said second and third terminals.

8. A frequency ringing trunk circuit as defined in claim 7 wherein:

said first circuit means includes a first relay having a coil connected between the first and fourth terminals and having normally closed contacts connected between said second and fifth terminals and said third and sixth terminals and having normally open contacts connecting said second and third terminals to said first detection circuit means.

9. A frequency ringing trunk circuit as defined in claim 8 wherein:

said fourth circuit means includes a second relay for connecting the selected one of said plurality of different frequency ringing signals to one of said fifth and sixth terminals.

10. A frequency ringing trunk circuit as defined in claim 9 wherein:

said fifth circuit means includes a third relay responsive to be actuated by a direct current circuit across said fifth and sixth terminals for applying a load across said second and third terminals and removing the selected ringing signal applied to said one of said fifth and sixth terminals.

11. A frequency ringing trunk circuit as defined in claim 10 wherein:

the direct current load applied across said second and third terminals by said third relay is applied through the normally open contacts of said first relay.

12. A frequently ringing trunk circuit as defined in claim 11 wherein:

the frequency of the selected ringing signal applied to the one of said fifth and sixth circuit means is of a different frequency than that frequency of the frequency ringing signals received in the one of said second and third terminals.

13. A frequency ringing trunk circuit as defined in claim 8 including:

sixth circuit means connected to said second and third terminals to disable said first detection circuit means except during the presence of a ringing signal on the second and third terminals.

14. A frequency ringing trunk circuit as defined in claim 13 wherein:

said sixth circuit means includes a capacitor series connected to a rectifying bridge and a relay connected across said rectifying bridge, said relay having normally open contacts for connecting said first detection circuit means to the second and third terminals during the presence of a ringing signal thereon.

References Cited

UNITED STATES PATENTS 2,118,520 1/1940 Wochinger ------ 179—175.2 B

RALPH D. BLAKESLEE, Primary Examiner

UNITED STATES PATENT OFFICE
CERTIFICATE OF CORRECTION

PATENT NO. : 3,712,963
DATED : January 23, 1973
INVENTOR(S) : Amin Y. Zaky

It is certified that error appears in the above-identified patent and that said Letters Patent are hereby corrected as shown below:

| | |
|---|---|
| Col. 5, line 16 | "RT6" should read ---RT-6---. |
| Col. 5, line 24 | After "different" insert ---party---. |
| Col. 6, line 42 | "Aslo" should read ---Also---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*